United States Patent [19]

Wheeler

[11] Patent Number: 4,496,481

[45] Date of Patent: Jan. 29, 1985

[54] PRODUCTION OF AZO COMPOUNDS

[75] Inventor: Ian R. Wheeler, Houston, Scotland

[73] Assignee: Ciba-Geigy Corporation, Ardsley, N.Y.

[21] Appl. No.: 329,860

[22] Filed: Dec. 11, 1981

[30] Foreign Application Priority Data

Dec. 23, 1980 [GB] United Kingdom ............... 8041277

[51] Int. Cl.$^3$ .............................................. C09B 29/32
[52] U.S. Cl. ................................................... 534/579
[58] Field of Search ......................................... 260/193

[56] References Cited

U.S. PATENT DOCUMENTS

| | | |
|---|---|---|
| 1,462,613 | 7/1923 | Murray . |
| 3,678,028 | 7/1972 | Blackwell et al. . |
| 3,793,305 | 2/1974 | Balon . |
| 3,900,459 | 8/1975 | Kawamura et al. . |
| 3,928,314 | 12/1975 | Rochat et al. . |
| 3,941,768 | 2/1976 | Stocker . |
| 4,255,375 | 3/1981 | Macpherson et al. . |

FOREIGN PATENT DOCUMENTS 2448994 4/1976 Fed. Rep. of Germany .

OTHER PUBLICATIONS

CA, 17, 3105, (1923).
CA, 85, 144699n, (1976).

*Primary Examiner*—Paul F. Shaver
*Attorney, Agent, or Firm*—Luther A. R. Hall

[57] ABSTRACT

A process for the production of an azo compound comprising contacting with agitation a solution or dispersion of a diazotizable amine, a solution or dispersion of a coupling component and an organic or inorganic nitrite compound, in a water insoluble liquid organic acid, adding to the reaction mixture so formed aqueous alkali to transfer the organic acid, as its soluble salt, into the aqueous phase and separating the azo compound from the liquors.

The azo compounds are produced in high yield and purity and are suitable for use as pigments and disperse dyes.

10 Claims, No Drawings

PRODUCTION OF AZO COMPOUNDS

The present invention relates to a process for the production of azo compounds, and in particular, those azo compounds suitable for use as pigments and disperse dyes.

Azo pigments are conventionally produced in aqueous media by treating a primary aromatic amine with an inorganic nitrite in aqueous mineral acid and then reacting the diazonium salt so formed with a coupling component which is either dissolved or dispersed in water.

However, this conventional process is disadvantageous in the following respects. Many diazonium salts are unstable in water, especially at elevated temperatures. Consequently, they must be maintained at temperatures below ambient temperature, during both diazotisation and coupling reactions, to reduce decomposition, and prevent the formation of water-insoluble by-products which contaminate the azo pigment product and thereby reduce its cleanliness of shade. Moreover, when the diazo component and/or the coupling component are insoluble or only sparingly soluble in water, the coupling reaction may be slow and inefficient resulting in reduced yields of pigment, particularly at low temperatures. This problem is more serious in reactions to produce pigments of high (>700) molecular weight. Such pigments, moreover, may be poorly crystallised and consequently be of poor lightfastness and heat resistance, thereby requiring a conditioning step e.g. recrystallisation by heating and/or contact with an organic solvent.

Many attempts have been made to overcome these disadvantages and thereby improve the efficiency and quality of aqueous azo coupling reactions. For example, wetting and dispersing agents and protective colloids have been added to the reaction mixture as auxiliary agents.

These measures are, however, frequently unsatisfactory in that the additives have a disadvantageous effect on the properties of the pigment in application.

Attempts have been made to overcome the aforementioned problems associated with the use of aqueous media by utilising anhydrous organic solvents as the media for the diazotisation and coupling reactions.

In B.P. No. 1,366,598, there is disclosed a process for preparing azo pigments by diazotising a primary aromatic amine in a hydrophobic organic solvent, such as chlorobenzene, to form a diazo solution or partial dispersion, then contacting with a solution or partial dispersion of the coupling component to effect a coupling reaction.

In B.P. No. 1,240,412, metal-free azo pigments, which are also free of sulphonic acid groups, are prepared by diazotisation and coupling in a water-immiscible organic solvent. The pigments obtained are optionally heated in high boiling solvents. The diazotisation stage is carried out without isolation of the diazo compound, and the coupling is performed in a heterogeneous phase whereby the diazo and/or the coupling components are present in suspension in organic solvents containing, at most, 10% water.

Utilisation of an anhydrous organic solvent for the preparation of metal-free azo compounds, many of high molecular weight and otherwise difficult to prepare, is described in B.P. No. 1,332,705. An ester of nitrous acid is added, preferably at 20°–50° C., to an anhydrous reaction mixture consisting of (a), a diazotisable amine; (b) a coupling component; (c) an organic acid having a $pK_a$ less than 3.0; and (d) one or more organic water-insoluble solvents, having a dielectric constant less than 15, the molar ratio (c)/(a) being less than 1. The product thus prepared is recovered by partial distillation of the solvent, followed by filtration and washing with solvent.

While such non-aqueous processes have certain advantages relative to aqueous processes, e.g. smooth diazotisation of primary aromatic amines, greater stability of diazonium salts in hydrophobic organic solvent, smooth coupling reaction and greater convenience in effecting after-treatments, the known non-aqueous processes are disadvantageous in some respects. Chief amongst these is the large bulk of solvent required to maintain the degree of intimate mixing necessary for fast and complete reaction with the high speed stirring methods typically employed. The high cost of organic solvent relative to water requires that for the process to be commercially viable, the solvent must be recovered. This is generally achieved either by distillation, which is energy intensive, or by filtration. The temperature required for distillation may cause an undesirable degree of crystallisation in certain lower molecular weight azo pigments, leading to inferior applicational performance. Additionally, low molecular weight azo pigments may also have appreciable solubility in the organic solvent, causing a loss of pigment yield during filtration and washing.

Simultaneous diazotisation and coupling processes in organic solvent require a source of acid in catalytic quantities, (typically 0.05–0.5 moles/mole of diazotisable amine) for the diazotisation step. Whilst this may be supplied by concentrated mineral acids, typical processes such as those disclosed in B.P. No. 1,240,412 and B.P. No. 1,332,705 utilise an organic acid such as acetic acid. Stronger acids, such trichloroacetic or trifluoroacetic acids are required in smaller quantities, typically 0.05 to 0.2 moles per mole of diazotisable amine. Such acids, whatever their concentration, must be removed from the pigment product, and thus present a further complication in the separation of the pigment product from the reaction mixture.

We have now found a means whereby the disadvantages associated with non-aqueous processes can be avoided.

According to the present invention there is provided a process for the production of an azo compound, which process comprises (a) contacting with agitation a solution or dispersion of a diazotisable amine, a solution or dispersion of a coupling component and an organic or inorganic nitrite compound in a water-insoluble liquid organic acid, optionally in the presence, as catalyst, of a second organic acid having a $pK_a$ below 3.0; (b) optionally subjecting the reaction mixture so formed to efficient grinding forces; (c) adding aqueous alkali to transfer the organic acid, as its soluble salt, into the aqueous phase; (d) separating the azo compound from the liquors, preferably by filtration, washing with water and drying; and (e) optionally regenerating the free organic acid for re-use in step (a), preferably by adding mineral acid, followed by separation e.g. by gravitational or centrifugal means.

The organic acid performs the dual functions of diazotising acid and organic solvent. Relative to previously-known processes, considerably less solvent is required in the process of the invention. For instance, the process of the invention is conveniently effected using 100–500 wt.% of solvent on azo product, whereas previous processes typically require 700–2000 wt.% of solvent on azo product.

The process of the invention is particularly useful for the production of azo compounds which are suitable for use as pigments and disperse dyes.

Pigments which benefit from exposure to efficient grinding forces in step (b) of the process include those which create a high viscosity in the reaction mixture having the relatively low organic acid concentrations discussed hereinbefore, so that conventional stirring would lead to poor mixing. Other pigments which benefit from the use of step (b) are those which, when produced in solvent, have a particle size too large for use as a pigment.

Amines suitable for use in the process of the invention are those diazotisable amines optionally substituted by non-water solubilising groups such as halogen, nitro, alkyl, alkoxy, cycloalkyl, aralkyl, alkaryl, aryl, amide or sulphonamide groups.

As examples of suitable amines there may be mentioned:

(A) primary aromatic amines, e.g. 2-, 3- and 4-chloroaniline, 2-, 3- and 4-nitroaniline, 2,3-, 2,4-, 2,5- and 3,4-dichloroaniline, 2-nitro-4-anisidine, 3-, 4-, or 5-nitro-2-anisidine, 2-chloro-4-nitroaniline, 2-nitro-4-chloroaniline, 2-nitro-5-chloroaniline, 2,5-dimethoxyaniline, 2,4,6-trimethylaniline, 4-benzyloxyaniline, 4-cyclohexylaniline, 2-phenoxyaniline, 4-phenylazoaniline, o-, m- or p-toluidine, 3-, 4-, 5- or 6-chloro-o-toluidine, 2,4-, 2,5-, 2,6- or 3,5-xylidine, 4- or 5-chloro-o-anisidine, o-, m- or p-phenetidine, or p-amino-2,5-dimethoxybenzonitrile;

(B) primary aromatic amines substituted by derivatives of carboxy- or sulphonic acid groups, e.g. 3- or 4-aminobenzanilide, 4-ethoxy-3-aminobenzamide, 4-chloro-3-aminobenzanilide, 4-methyl-3-aminobenzoic acid-4′-chloroanilide, 1-amino-2,5-diethoxybenzene-4-sulphanilide, or 1-amino-2-methoxybenzene-4-sulphanilide;

(C) heterocyclic amines, e.g. 5-amino-benzimidazolone, 7-aminoquinolone, 5-amino-phthalimide and their substituted derivatives.

(D) aromatic diamines, e.g. 3,3′-dimethyl-, 3,3′-dichloro-, 3,3′-dimethoxy- or 3,3′-diethoxybenzidine, 3,3′-dimethoxy-2,2′-dichlorobenzidine, 2,5,2′,5′-tetrachlorobenzidine, 1,5-diaminonaphthalene or 3,3′-diaminobenzanilide.

As examples of coupling components for use in the process of the invention, there may be mentioned: acetoacetic acid arylamides optionally substituted with one or more groups such as aryl, alkyl, arylaklyl, alkoxy, aryloxy, hydroxy, halogen (e.g. chlorine or bromine), amide, imide, ester, or nitro groups; or acetoacetarylamide derivatives of optionally suitably substituted heterocyclic amine-containing compounds such as those commonly used for the production of azo pigments and disperse dyes.

Examples of such coupling components are e.g. acetoacetylaminobenzene, 2-acetoacetylaminotoluene, 4-acetoacetylaminotoluene, 2-acetoacetylaminoanisole, 4-acetoacetylaminoanisole, 2-acetoacetylaminophenetole, 4-acetoacetylaminophenetole, 1-acetoacetylamino-2,4-dimethylbenzene, 1-acetoacetylamino-2,4-dimethoxybenzene, 1-acetoacetylamino-2,5-dichlorobenzene, 1-acetoacetylamino-2,5-dimethoxy-4-chlorobenzene, 5-chloro-2-acetoacetylaminotoluene, 3-chloro-4-acetoacetylaminotoluene, 1-acetoacetylaminonaphthalene, 2-acetoacetylaminonaphthalene, and 5-acetoacetylaminobenzimidazolone.

Further coupling components useful in the process of the present invention include those of the pyrazolone series e.g. 1-phenyl-3-methylpyrazol-5-one, 1-(p-tolyl)-3-methylpyrazol-5-one and 1-phenyl-3-ethoxycarbonyl-pyrazol-5-one, and barbituric acids.

Further suitable pyrazolone coupling components include 1-arylpyrazol-5-ones in which the aryl group is phenyl, optionally substituted by one or more group e.g. halogen atoms or $C_1$–$C_4$ alkyl or alkoxy groups; or the aryl group is derived from 1-amino-naphthalene or 2-amino-naphthalene.

Other suitable components are 1-naphthol and 2-naphthol and halogen- and carboxy-substituted derivatives thereof, especially 3-hydroxynaphthalene-2-carbonilide and its derivatives such as 3-hydroxynaphthalene-2-carboxylic acid-2′-methyl anilide.

Organic acid solvents suitable for the process of the invention are substantially water insoluble, and are liquids within the recited temperature range of the reaction. They include $C_4$–$C_{10}$ linear, branched or substituted alkyl or cycloalkyl acids in which the alkyl residue may or may not be interrupted by other atoms, such as, e.g., oxygen, nitrogen, sulphur or a functional group, such as, e.g., a carbonyl or sulphonyl group.

Alternatively, the acids may be substantially water insoluble aromatic or substituted aromatic compounds, e.g. an alkylated benzoic acid or a phenyl substituted aliphatic acid. Alternatively, the organic acid solvent used may contain more than one acid residue and, in these cases, the compounds used may be esters or derivatives of the organic acid solvent, while still retaining at least one acid function, e.g. the monomethyl ester of adipic acid.

Preferred acids are the $C_5$–$C_8$ straight and branched chain monocarboxylic acids, such as n-pentanoic, n-hexanoic, 2-ethyl hexanoic and octanoic acids. Mixtures of the recited organic acids may also be used, particularly commercially available mixtures.

Low molecular weight acids provide the fastest rates of diazotisation and coupling, consequent upon their greater acidity. However, increasing water solubility below $C_4$ reduces acid recovery for recycle below acceptable commercial limits.

Higher molecular weight aliphatic acids are increasingly water insoluble, but promote slower reaction rates. Moreover, acids such as isononanoic and decanoic are more expensive, and may cause emulsification of the phases during acid recovery.

Alkalis suitable for rendering the organic acid solvent water soluble are those capable of reversible formation of a water soluble salt with the organic acid solvent. Ammonia, sodium hydroxide and potassium hydroxide are preferred.

There may be used as diazotising agents, nitrous acid esters, especially of primary or secondary alcohols having 1–8 carbon atoms. Examples of such esters are the liquid nitrites of butyl-, isobutyl-, pentyl-, isopentyl-, heptyl- and octyl alcohol, as well as benzyl alcohol, having a boiling point above 50° C. The esters may also be derived from alcohols containing 1–3 carbon atoms, i.e. the methyl, ethyl, propyl or isopropyl esters which have a boiling point below 50° C. and are gaseous or very readily volatile liquids. Alternatively, an inorganic nitrite compound, such as sodium nitrite, may be used.

The nitrite may be added to the reaction mixture in a solid, liquid or gaseous state, but the propyl, isopropyl and butyl nitrites, added either in the liquid form or dissolved in the organic acid solvent, are preferred.

For optimum production of pure azo compound, it is desirable that the rate of consumption of nitrite and the rate of formation of azo compound are approximately equal. To this end, the optimisation of reaction conditions, such as temperature, concentration, and catalyst type and amount, is a matter of experiment. It should be noted, however, that for azo compounds which are slow to form at ambient temperature, an increase in reaction temperature may promote decomposition of nitrite to oxides of nitrogen, rather than an acceleration in azo compound formation. In such cases a strong organic acid catalyst should be employed at a relatively low temperature, and the rate of nitrite addition reduced. The presence of an excess of nitrite in the reaction mixture is indicated by a blue colouration formed when a little of the reaction mixture is contacted with starch-potassium iodide paper impregnated with 50% aqueous hydrochloric acid solution.

As examples of strong organic acid catalysts there may be mentioned mono- and poly-$\alpha$-halogenated aliphatic carboxylic acids having 2–6 carbon atoms such as $\alpha$-chloroacetic acid, $\alpha$-chloropropionic acid, $\alpha,\alpha$-dichloroacetic acid, $\alpha,\alpha,\alpha$-trichloro- and $\alpha,\alpha,\alpha$-trifluoroacetic acids, and perfluorobutyric acid.

Sulphonic acids, such as methane sulphonic, toluene sulphonic and xylene sulphonic acids may also be used.

The optimum amount of acid catalyst is different for each acid. For example, weaker acids, such as $\alpha$-chloroacetic acid require 0.2–0.5 moles per mole of diazotisable amine, whereas very strong acids, such as perfluorobutyric acid act in amounts as small as 0.05–0.2 moles per mole of an amine.

The reaction temperature may be between $-20°$ C. and $+100°$ C., advantageously between $10°$ C. and $50°$ C.

The reaction can be performed in a homogeneous or heterogeneous phase. A homogeneous phase obtains where the constituents of the reaction mixture are sufficiently soluble in the organic acid solvent.

The optimum order in which amine, coupling component, nitrite and organic acid solvent should be contacted for preparation of any given azo compound can readily be determined by experiment. In general, the premixing of amine and coupling component, in the organic acid solvent, followed by addition of the nitrite, has been found most satisfactory.

Conditions of intimate mixing and grinding of raw materials and products during the reaction may be provided by a bead mill, such as a Dyno ® mill. Z-blade mixers, ball mills and high shear mixers may also be used.

The azo compounds of the invention may be prepared by batch or continuous techniques. In a preferred embodiment of the process of the invention, a diazotisable amine and coupling component, in stoichiometric amounts, are dispersed by high speed stirring in 250 wt.% (on pigment product) of a $C_5$–$C_8$ aliphatic carboxylic acid. The slurry is pumped into a Dyno ® mill, into which is simultaneously fed a second stream, consisting of stoichiometric quantity of a $C_3$–$C_5$ nitrite as a solution in a further 100 wt.% on pigment of the same organic acid. During the residence time within the mill, azo pigment is formed in high yield.

The pigment slurry is continously discharged from the mill, and passed through an in-line mixer, into which aqueous ammonia solution is continuously metered. The pigment slurry, at pH 8-9, is passed to filtration equipment, optionally via a holding vessel. The pigment is washed with water and dried. The filtrate is recovered, acidified and separated for re-use.

If desired, a heat treatment may be included in the process by interposing an in-line heat exchanger, either between the mill and the in-line mixer, or between the in-line mixer and the filtration equipment.

The process according to the invention produces azo compounds in high yield and purity by an easily controlled, optionally continuous, process. Formation of the azo compound, together with its conditioning and aftertreatment can, if desired, be performed in a single vessel without isolation of the intermediate stages.

As no heating is required for recovery of the acid solvent, there is no possibility of either thermal damage to, or unwanted crystal growth of, heat sensitive azo compounds. Furthermore, conversion of the acid to a water soluble salt at the recovery stage ensures that no azo compound is lost during filtration due to solubility in the acid solvent.

Recovery of the acid solvent by pH change is more convenient and less demanding on equipment than the processes of the prior art. In addition, inherently lower acid solvent recovery costs, compared to distillation/filtration, together with the lower quantity of acid solvent, combine to effect considerable savings in recovery costs. Acid solvent recovery levels are high, typically >95% of the acid solvent input. Unlike distillation, in which unreacted amine and coupling component are retained in the azo compound and require washing with solvent at the filtration stage for their removal, it is found in the present process that any unreacted amine and/or coupling component is substantially removed under the aqueous alkaline conditions prevailing prior to filtration. This observation is the more surprising because only relatively low molecular weight coupling components would be expected to be removable by aqueous alkali. However unreacted traces of certain low molecular weight amines are found in recovered free acid solvent. In such cases the amine is very usefully recycled with the acid solvent, simultaneously effecting increased yields of azo compounds from the reaction, and decreased pollution problems from the aqueous waste liquors of the acid recovery process.

The process according to the invention permits a variety of aftertreatments not readily available to conventional aqueous couplings. For example, (a) thermal treatment above $100°$ C. to effect an improvement in the opacity and lightfastness of pigments and (b) incorporation of polymers, resins and pigment additives incapable of solution in aqueous media but soluble in the organic acid solvent, with the aim of producing pigment composition with enhanced performance in specific application media.

As examples of such polymers, resins and additives there may be mentioned the basic pigment derivatives of our British Patent Specification No. 1,486,117. Other suitable additives are those described in British Patent Specification No. 1,589,159, including carboxylic acid esters and amides such as glycerol tristearate, dicyclohexyl phthalate and oleamide, resins such as hydrocarbon resins and water—insoluble fatty alcohols such as cetyl alcohol. Wood rosin and its derivatives such as hydrogenated wood rosin may also be used.

An advantageous embodiment of the invention is that certain coupling components, for example, those of the pyrazolone and acetoacetarylamide series, can be prepared in the organic acid solvent, by the reaction of diketene with the appropriate amine, prior to the addition of the diazotisable amine.

Another advantageous embodiment of the process according to the invention, which it is not possible to reproduce by previously known coupling processes in solvent is the preparation of non-dusting, free-flowing, bead products described in British Patent Specification No. 1,589,159.

The pigments produced in the process of the present invention exhibit properties similar to those of similar pigments produced by known processes, when incorporated into a variety of application media. Such media include paint, plastics and especially printing inks, e.g. liquid or packaging inks such as those based on nitrocellulose or polyamide resins, publication gravure inks, and oil inks for lithographic or letterpress printing applications.

EXAMPLE 1

To a glass vessel of ½ liter capacity, having vertical sides and a hemispherical base, and fitted with a paddle stirrer, are charged 400 g of 1-3 mm diameter glass beads, 100 ml of 2-ethyl-hexanoic acid, 16.8 g of p-nitro-o-anisidine and 22.0 g of acetoacet-o-anisidide.

With stirring at 600 rpm, the mixture is dispersed for 10 minutes, attaining a temperature of 23° C. With continued stirring there are added over 5 minutes, 7.08 g of dry sodium nitrite. Pigment formation commences immediately, indicated by an increase in both temperature and viscosity. After 10 minutes a further 50 ml of 2-ethylhexanoic acid are run in over 5 minutes to reduce the viscosity and promote more efficient milling. A maximum temperature of 35° C. is reached approximately 20 minutes after the completion of the sodium nitrite addition. Reaction is continued for a further 40 minutes, and the vessel contents, now at 29.5° C., are discharged into a stirred solution of 90 g of concentrated ($\delta = 0.88$) aqueous ammonia in 1000 ml of water at 45° C.

The slurry is stirred for 30 minutes, maintaining the pH at 8.5-9 by further additions of aqueous ammonia as required. The glass beads are separated on a coarse nylon screen. Recovery of the C.I.Pigment Yellow 74 product is by filtration, washing, first with dilute aqueous alkali, then with water and drying at 55°-60° C. The yield is 35.4 g, 91.7% of theory.

If in this Example, the reaction time is increased to 3 hours, the yield rises to 98.4% of theory.

The alkaline filtrate of this Example is acidified to pH4 with aqueous hydrochloric acid. On standing for 2 hours at room temperature, the regenerated 2-ethylhexanoic acid separates from the aqueous phase, and is recovered in a yield of 144.7 ml, 96.5% of the input. This material is suitable for re-use in the process of the invention.

EXAMPLE 2

To a ½ liter glass vessel are charged 200 g of 2-3 mm diameter glass beads, 100 ml of 2-ethyl-hexanoic acid, 9.36 g 2-methoxy-5-diethylaminosulfonyl aniline and 13.55 g of 2-hydroxy-3(2',4'-dimethoxy-5'-chloro)naphthanilide.

The mixture is stirred 1 hour at 600 rpm, and with continued stirring, 3.0 g of sodium nitrite are added. The thick pigment slurry formed after a further 1 hour is diluted with a solution of 30 ml concentrated ammonia solution in 200 ml water, stirred 15 minutes and the glass beads separated. The pigment slurry is heated to 70° C. by the introduction of live steam, filtered, washed with water and dried at 55° C. There are obtained, 21.4 g (94.3% of theory) of C.I.Pigment Red 5 having excellent strength, gloss and cleanliness when incorporated in an alkyd-melamine paint medium.

EXAMPLE 3

8.4 g of p-nitro-o-anisidine, 10.56 g of acetoacet-o-anisidide, 0.47 g of α-chloroacetic acid and 100 ml of 2-ethyl-hexanoic acid are charged to a vented ¼ liter ball mill containing 250 g of 0.9 mm diameter Steatite balls and milled 1 hour. (A further 20 ml of 2-ethylhexanoic acid are added after 45 minutes to counteract excessive thickening of the mixture). 3.52 g of dry sodium nitrite are added and milling continued for a total of 10 hours, venting any slight pressure build-up as required.

During this time an extra 0.1 g of sodium nitrite are added when a spot test of the reaction mixture on starch/potassium iodide paper moistened with hydrochloric acid fails to produce a blue colouration.

The pigment thus formed is recovered by discharging the ball mill contents into 500 ml of water at 40° C., containing 90 ml of concentrated ammonia solution. The temperature is raised to 70° C. by live steam and the product filtered from pale yellow liquors, washed with 1 liter of water at 70° C., then with a solution of 1 g of sodium hydroxide in 1 liter of water at 70° C., and finally with 3 liters of water, also at 70° C. After drying at 55° C. there are obtained 19.25 g (99.7% of theory) of soft textured C.I.Pigment Yellow 74 product.

EXAMPLE 4

To a ½ liter glass grinding pot there are charged 200 g of 2-3 mm glass beads, 6.32 g of 3,3'-dichlorobenzidine, 10.76 g of acetoacet-metaxylidide and 50 ml of 2-ethylhexanoic acid.

The mixture is stirred for 2 hours at 600 rpm, then there are added 3.62 g of dry sodium nitrite. Stirring is continued and pigment formation commences. After 15 minutes 25 ml of 2-ethyl-hexanoic acid are added and grinding continued for a further 3¾ hours.

A solution of 31 g of concentrated ammonia solution in 120 ml water is run in and stirred 30 minutes. The glass beads are separated by filtration and the slurry diluted with water to 500 ml, before itself being filtered and washed with warm water.

The C.I.Pigment Yellow 13 presscake thus obtained is resuspended in 900 ml warm water with the air of a Silverson ® stirrer. With paddle stirring, 0.226 g of a dyestuff, prepared by the coupling of benzidine-3,3'-disulphonic acid onto acetoacetmetaxylidide, are added as a solution in 50 ml hot water. This is followed by 8.79 g of hydrogenated wood rosin in the form of a 5% aqueous solution of the potassium salt, added over 5 minutes.

The temperature of the slurry is raised to 90°-95° C. over 15 minutes, and the pH reduced to 5.0 with dilute hydrochloric acid solution over 10 minutes. After maintaining 90°-95° C. for a further 10 minutes, the temperature is reduced to 80° C. by addition of cold water. The pigment composition is recovered in a yield of 25.3 g (95% of theory) by filtration, washing with warm water and drying at 55° C. The product thus obtained has excellent dispersibility in oil ink media.

EXAMPLE 5

There are stirred together in a ½ liter grinding pot for 1 hour at 25° C., 200 g of 2–3 mm glass beads, 8.4 g of p-nitro-o-anisidine, 11.6 g of acetoacet-o-chloroanilide, and 50 ml of 2-ethylhexanoic acid. On addition of 4.14 g of sodium nitrite with continued stirring, the slurry rapidly turns yellow and increases in viscosity, such that a further 42 ml of 2-ethylhexanoic acid have to be added after 5 minutes to maintain fluidity. After reaching a maximum temperature of 37.5° C. after 16 minutes, the temperature falls to 36° C. after 30 minutes reaction. At this point, 60 g of concentrated ammonia solution, diluted to 200 ml with water are run in, stirred 10 minutes and the glass beads separated off. The volume is diluted to 700 ml at pH 9.5 and 40° C., and the pigment product filtered off, washed and resuspended in 1000 ml water at 40° C.

With paddle stirring, 21 g of Carboset®XL11, an acrylic resin, in the form of a 30% solids aqueous dispersion, are added over 10 minutes, whilst simultaneously maintaining a pH of 10 by addition of dilute sodium hydroxide solution as required. The slurry is stirred for 5 minutes and the resin precipitated by reduction of the pH to 4.5 over 20 minutes with 1M hydrochloric acid solution. The coarse textured pigment composition is easily recovered by filtration, washing and finally drying under vacuum at 55° C. The product, in a yield of 38.1 g (90.7% of theory) is capable of dispersion in an alkaline aqueous ink medium containing 30% ethanol, by high speed stirring.

EXAMPLE 6

250 g of 0.9 mm diameter steatite balls, 6.32 g of 3,3'-dichlorobenzidine, 10.56 g of acetoacet-o-anisidide, 100 ml of 2-ethylhexanoic acid and 0.47 g of α-chloroacetic acid are milled together for one hour in a ¼ liter vented ball mill. 3.52 g of dry sodium nitrite are added and milling continued for six hours, venting the contents periodically. A further 20 ml of 2-ethylhexanoic acid have to be added after 30 minutes to maintain a satisfactory grinding viscosity. On recovery as previously in aqueous ammonia solution, 15,92 g (92.5% of theory) of C.I.Pigment Yellow 17 product are obtained.

EXAMPLE 7

9.1 g of 2,4,5-trichloroaniline, 13.5 g of 3-hydroxy-2'-methyl-naphthanilide and 100 ml of 2-ethylhexanoic acid are premixed as in Example 2. 4.1 g of dry sodium nitrite are added, followed 5 minutes later by 20 ml of 2-ethylhexanoic acid. After stirring for a further 1½ hours, the pigment product is recovered as previously, using aqueous ammonia solution. There are obtained 21.1 g of C.I. Pigment Red 112 product, a yield of 94.2% of theory.

EXAMPLE 8

9.95 g of p-chloro-o-nitro aniline, 12.35 g of acetoacet-o-chloroanilide, 130 ml of 2-ethylhexanoic acid and 2.5 g of α-chloroacetic acid are stirred together for 5 minutes by a Silverson® high speed stirrer. External cooling is applied to reduce the temperature of the mixture to 5° C. With further high speed stirring, 4.03 g of dry sodium nitrite are added and external cooling applied to prevent the temperature of the mixture from rising above 45° C. After 30 minutes, the C.I.Pigment Yellow 3 product is recovered as previously in a yield of 16.92 g, (74.3% of theory).

EXAMPLE 9

4.2 g of p-nitro-o-anisidine, 6.1 g of 5-acetoacetylaminobenzimidazolone, and 70 ml of 2-ethylbutyric acid are stirred for 55 minutes at 600 rpm in a ½ liter glass grinding pot containing 200 g of 1–2 mm diameter glass beads. 0.58 g of α-chloroacetic acid are added, followed 5 minutes later by 1.81 g of dry sodium nitrite. With continued stirring, the temperature rises within 5 minutes from 18.5° C. to 25° C., at which time 30 ml of 2-ethylbutyric acid and 0.2 g of sodium nitrite are added. A maximum temperature of 28° C. is achieved 16 minutes after the original sodium nitrite addition. Thereafter the temperature and viscosity both drop over the remaining 45 minutes reaction time.

The reaction mixture is discharged into 500 ml of water and the pH raised to 8.0 and maintained thereat by addition of concentrated aqueous ammonia solution. The slurry is stirred for 30 minutes, then raised to 95° C. by the introduction of steam, held at 95° C. for 5 minutes and allowed to cool to 70° C. After adjusting the pH to 8.7, the orange pigment product is filtered, washed with 3 liters water at 95° C. and dried at 55° C. The yield is 7.38 g (71.6%).

EXAMPLE 10

Using the method of Example 9, 7.45 g of 5-aminobenzimidazolone, 6.72 g of barbituric acid, 50 ml of 2-ethylbutyric acid and 1.17 g α-chloroacetic acid are milled together, a further 50 ml of 2-ethylbutyric acid being added after 30 minutes. With the temperature at 20° C., 3.0 g of sodium nitrite are introduced, followed by 0.62 g and 0.3 g after 5 and 20 minutes respectively. A maximum temperature of 31° C. is reached after 12 minutes. After two hours, with the temperature at 23° C., concentrated ($\delta$=0.88) ammonia solution diluted by double its weight of water is run in to maintain pH 8.5 over 30 minutes. The glass beads are removed by filtration, and the pigment product recovered by a second filtration, with washing with water at 85°–90° C., and drying. A yield of 14.2 g (98.7%) of orange powder is obtained.

EXAMPLE 11

400 g of 4 mm diameter glass beads, 100 ml of 2-ethylhexanoic acid, 16.8 g of p-nitro-o-anisidine, 22.0 g of aceto-acet-o-anisidide, and 0.94 g of α-chloroacetic acid are milled together in a 700 ml glass grinding pot. A solution of 19.3 g of Hercures. A.80® (a hydrocarbon resin of Hercules Powder Co. Ltd) in 100 ml of 2-ethylhexanoic acid are stirred in, followed by 7.08 g of dry sodium nitrite. The mixture is milled 2 hours, and the C.I. Pigment Yellow 74 pigment composition recovered in a yield of 54.4 g (94% of theory). The product has good dispersibility and gloss in oil inks.

EXAMPLE 12

Using the apparatus of Example 11, a premix is prepared by milling together for 1 hour, 12.64 g of 3,3'-dichlorobenzidine, 21.12 g of acetoacet-o-anisidide and 100 ml of 2-ethylhexanoic acid. Meanwhile, 1.88 g of α-chloroacetic acid are dissolved in 200 ml 2-ethylhexanoic acid. 15.1 g of n-butanol and 14.08 g of dry sodium nitrite are added with stirring and the temperature raised to 30° C. for 45 minutes. 100 ml of this solution, containing butyl nitrite, are added to the stirring premix. Further additions of butyl nitrite solution are made over a 2 hour period in order to maintain a slight excess of nitrite, as indicated by a pale blue spot on starch-/potassium iodide paper moistened with mineral acid. The pigment slurry thus obtained is separated from the glass beads and held at 120° C. in an oil bath for 2 hours. Thereafter, the slurry is cooled and the C.I.Pigment Yellow 17 product recovered.

The product of this Example is weaker and redder, but considerably more opaque than the corresponding pigment prepared by either conventional aqueous coupling or by the method of this Example in which the thermal treatment stage is omitted.

EXAMPLE 13

8.62 g of p-chloro-o-nitroaniline, 10.89 g of acetoacet-o-chloroanilide, 2.36 g of α-chloroacetic acid and 50 ml of 2-ethylhexanoic acid are stirred at 600 rpm for 1 hour in a ½ liter grinding pot containing 200 g of 2–3 mm diameter glass beads. The temperature reaches 26° C. 4.14 g of sodium nitrite are added and stirring continued. As pigment formation commences and the grinding viscosity increases, 25 ml portions of 2-ethylhexanoic acid are added after 2 and 5 minutes. A maximum temperature of 36° C. is obtained after 16 minutes, and after 1 hour, at a temperature of 32° C., aqueous ammonia solution is added and the pigment product recovered, washing well with hot water at the filtration stage. The C.I. Pigment Yellow 3 product, obtained in a yield of 17.84 g (90.3% of theory) is approximately 20% stronger and slightly redder than the corresponding product prepared by conventional aqueous coupling, when dispersed in a decorative alkyd paint system.

Similar results are obtained when the α-chloroacetic acid of this Example is replaced by 2.45 g of trichloroacetic acid. A reduced yield of 68.9% is obtained by the use of 1.9 g of p-toluene-sulphonic acid as catalyst.

EXAMPLE 14

The method of Example 13 is repeated with replacement of 2-ethylhexanoic acid by isononanoic acid. The pigment is recovered in a yield of 14.14 g (71.6% of theory).

EXAMPLE 15

The method of Example 13 is used to prepare C.I. Pigment Yellow 1 in 96% yield by the 1½ hour reaction of premixed m-nitro-p-toluidine, 7.6 g, and acetoacetanilide, 9.0 g, with 4.5 g of sodium nitrite.

EXAMPLES 16–20

Using the method of Example 13, 8.4 g of p-nitro-o-anisidine are reacted with 3.5 g of sodium nitrite and a 4% stoichiometric excess (based on p-nitro-o-anisidine) of the coupling components of Table 1 in a 2-ethylhexanoic acid medium containing 0.94 g of α-chloroacetic acid catalyst. The products obtained and the yields thereof are also described in Table 1.

EXAMPLES 21 and 22

The method of Example 13 is repeated, substituting for the acetoacet-o-chloro-anilide therein, an equivalent stoichiometric quantity of the coupling components shown in Table 1. The products obtained and the yields thereof are also described in Table 1.

TABLE 1

| Example | Coupling Component | Total 2-ethyl-hexanoic acid (ml) | Product | Yield (%) |
|---|---|---|---|---|
| 16 | 1-acetoacetylamino anthraquinone | 220 ml | red-shade yellow | 99.1 |
| 17 | 5-(3'-methyl-pyrazol-5'-on-1'-yl)benzimidazolone. | 120 ml | orange | 81.1 |
| 18 | acetoacetyl-p-hydroxyanilide | 100 ml | orange-red | 84.0 |
| 19 | bis-acetoacet-p-phenylenediamine | 100 ml | orange | 94.9 |
| 20 | bis-acetoacet-1,2 ethylene diamine | 100 ml | green-shade yellow | 94.8 |
| 21 | acetoacet-5-chloro-o-toluidide | 100 ml | strong mid-shade yellow | 93.5 |
| 22 | acetoacet-2,3-dichloroanilide | 140 ml | red-shade yellow | 92.1 |

EXAMPLE 23

12.3 g of o-anisidine are stirred into 100 ml 2 ethylhexanoic acid and 8.4 ml of diketene run in over 10 minutes. External heat is applied to raise the temperature to 100° C., maintained 5 hours. To the cooled solution, agitated by a high speed sawtooth stirrer, there are added 16.78 g of p-nitro-o-anisidine and 0.62 g of acetoacet-2-amino pyridine.

After 15 minutes, iso-butyl nitrite is added as required to maintain a slight excess of nitrite as indicated by acidified starch-iodide paper. A further 100 ml of 2-ethylhexanoic acid are added after 30 minutes to aid fluidity. After a total reaction time of 1 hour, aqueous ammonia is added and the pigment product filtered off, washed with hot water and dried at 55° C. A 69% yield of a strong, very transparent C.I. Pigment Yellow 74 composition is obtained.

EXAMPLE 24

In a ½ liter glass pot having a hemispherical base, a mixture of 6.32 g of 3,3'-dichlorobenzidine, 10.56 g of acetoacet-o-anisidide and 50 ml 2-ethylhexanoic acid is stirred for 1 hour at 800 rpm by a sawtooth stirrer. Meanwhile, in a second vessel, 0.94 g of α-chloroacetic acid are dissolved with stirring in 100 ml of 2-ethylhexanoic acid. 7.55 g of isobutanol and 7.04 g of sodium nitrite are added and stirred at 25°–30° C. for 1 hour. Sufficient of this suspension is added to the amine and coupling component mixture, now stirring at 1500 rpm, to maintain a slight nitrite excess over 4 hours, and until the uptake of nitrite has ceased.

With external heating, the temperature is raised to 105° C. and maintained for 30 minutes. The pigment slurry is discharged into 1 liter water, and with stirring the pH raised to 9.0 with dilute aqueous ammonia solution. The temperature is raised to 95° C., held 30 minutes, and the C.I. Pigment Yellow 17 product recovered in a yield of 77% by filtration, hot washing and drying. The product of this Example is appreciably more opaque in application than a similar product prepared without the aftertreatment for 30 minutes at 105° C.

EXAMPLE 25

To a ½ liter glass grinding pot there are charged 200 g of 2–3 mm glass beads, 6.32 g of 3,3'-dichlorobenzidine, 10.76 g of acetoacet-metaxylidide and 70 ml of n-octanoic acid. The mixture is stirred for 1 hour at 600 rpm after which 3.75 g of dry sodium nitrite are added in portions to maintain a slight nitrite excess. The reaction time is 3 hours, during which a further 50 ml of n-octanoic acid are added to maintain fluidity.

0.25 g of dyestuff formed by coupling benzidine-3,3'-disulphonic acid onto acetoacet-metaxylidide are dissolved in 30 ml n-octanoic acid. 8.79 g of a hydrogenated wood rosin are added and also stirred to solution. The mixture is added to the pigment slurry and stirred for 2½ hours. The glass beads are separated and the slurry poured into 1 liter water at 40° C., heated to 95° C., then allowed to cool to 70° C. Aqueous ammonia solution is added to raise the pH to 7.5, maintained over 30 minutes. Thereafter, the C.I.Pigment Yellow 13 composition is filtered off, washed with hot water and dried at 60° C., yielding 23.2 g of yellow powder, 88.7% of theory.

EXAMPLE 26

The amine and coupling component of the previous Example are reacted by the method of Example 24. Dyestuff and rosin of the previous Example, dissolved in 25 ml of 2-ethylhexanoic acid, are added and the temperature raised to 90° C. for 5 minutes by means of an oil bath. The slurry thus obtained is added to 1 liter water at 40° C., containing 0.05 g of hydroxy-ethyl-cellulose at pH 5. After 1 hour, the pH is raised to 7.5 over 30 minutes with dilute aqueous ammonia solution, and maintained thereat for a further 30 minutes. The pigment beads of ~1 mm diameter thus obtained are isolated by filtration, washing and drying, in a yield of 80.5% of theory.

EXAMPLE 27

A mixture of 3 liters of 2-ethylhexanoic acid, 504 g p-nitro-o-anisidine, 660 g of acetoacet-o-anisidine and 12 g of α-chloroacetic acid are stirred for 15 minutes with a Silverson ® stirrer fitted with a disintegrator head. The slurry is cooled to 25° C. and continuously fed into a 1 liter Dyno ® mill at a rate of 15 ml/min. There is simultaneously introduced into the mill, at a rate sufficient to maintain a slight nitrite excess, a solution of 304 g of n-butyl-nitrite dissolved in 1.5 liters of 2-ethyl-hexanoic acid. Cooling is applied to the mill to prevent the internal temperature from exceeding 37° C. The pigment product continuously discharged from the mill is passed through a stirred holding vessel of 1 liter volume and thence to a further vessel, into which dilute aqueous ammonia solution is continuously added to produce a pH of 9.0. The C.I. Pigment Yellow 74 slurry discharged from this vessel is filtered, washed and dried. The yield is 94.5% of theory.

EXAMPLE 28

400 g of 2-ethylhexanoic acid, 168 g of p-nitro-o-anisidine, and 220 g of acetoacet-o anisidide ar charged to a Z-blade mixer, and with cooling, intimately mixed for 40 minutes. Then there are added over 30 minutes, 71 g of sodium nitrite, whilst circulating cooling water to prevent the temperature from rising above 35° C. After a further 1 hour, the C.I. Pigment Yellow 74 paste is discharged and recovered by treatment with dilute aqueous sodium hydroxide solution, washing and finally drying at 55° C. The yield is 328 g (85% of theory).

I claim:
1. In an improved process for the production of an azo compound in one step by the simultaneous diazotisation and coupling with agitation of a mixture of a diazotisable amine, a coupling component and an organic or inorganic nitrite, each dissolved or dispersed in a water-insoluble liquid organic acid in the absence of any other solvent component, at a temperature of −20° to 100° C., the improvement comprises
    carrying out the reaction in a straight or branched-chain alkanoic acid of 4 to 10 carbon atoms or in a mixture of said acids,
    adding to the reaction mixture, after reaction is complete, sufficient aqueous alkali to convert said alkanoic acid to its water-soluble alkaline salt which is transferred into the aqueous phase, from which the free alkanoic acid is recovered, for eventual recycle in the process, by subsequent acidification of the aqueous phase of pH 4 with mineral acid to form a two-phase system from whence the free acid is recovered in high yield as the organic phase by gravitational or centrifugal means, and
    isolating the insoluble azo compound from the resultant mixture.
2. A process according to claim 1, wherein the diazotisable amine used is a primary aromatic amine unsubstituted or substituted by non-water solubilising groups; a primary aromatic amine substituted by derivatives of carboxy- or sulphonic acid groups; or an aromatic di-amine; or a heterocyclic amine.
3. A process according to claim 1, wherein the coupling component used is an unsubstituted or substituted acetoacetic acid arylamide group; an acetoacetarylamide derivative of an unsubstituted or substituted heterocyclic amine-containing compound; a pyrazolone coupling component; a 1- or 2-naphthol; a 3-hydroxy-2-naphthanilide or a barbituric acid.
4. A process according to claim 1, wherein the organic acid is a $C_5$–$C_8$ alkanoic acid.
5. A process according to claim 1, wherein the amount of organic acid used, as diazotising acid and solvent, is from 100 to 500 weight %, based on the weight of azo compound.
6. A process according to claim 5, wherein the diazotising agent is a nitrous acid ester or inorganic nitrite.
7. A process according to claim 5, wherein an amine which is slow or difficult to diazotise and couple is used, and there is added a catalytic amount of a strong organic acid, i.e. an acid of $pK_a < 3.0$.
8. A process according to claim 7, wherein the strong organic acid is a mono- or poly-α-halogenated aliphatic carboxylic acid having 2–6 carbon atoms, or a sulphonic acid.
9. A process according to claim 7, wherein the amount of acid catalyst is from 0.05–0.5 mole per mole of diazotisable amine.
10. A process according to claim 1, wherein the alkali used is ammonia, sodium hydroxide or potassium hydroxide.

\* \* \* \* \*

UNITED STATES PATENT AND TRADEMARK OFFICE
CERTIFICATE OF CORRECTION

PATENT NO. : 4,496,481

DATED : January 29, 1985

INVENTOR(S) : Ian R. Wheeler

It is certified that error appears in the above-identified patent and that said Letters Patent is hereby corrected as shown below:

Claim 1, Column 14, Line 31 should read-- the aqueous phase to pH 4 with mineral acid to --.

Claim 6, Column 14, Line 54 should read--

A process according to claim 1, wherein the diazo- --.

Claim 7, Column 14, Line 56 should read--

A process according to claim 1, wherein an amine --.

Signed and Sealed this

Seventeenth Day of September 1985

[SEAL]

Attest:

DONALD J. QUIGG

Attesting Officer

Commissioner of Patents and
Trademarks—Designate